United States Patent Office 3,181,953
Patented May 4, 1965

3,181,953
COLD WATER SOLUBLE COMPOSITIONS
John H. Van Ness, Kirkwood, and Darwin O. Stephens, Affton, Mo., assignors to Monsanto Company, a corporation of Delaware
No Drawing. Filed Mar. 25, 1963, Ser. No. 267,844
15 Claims. (Cl. 99—78)

This invention relates to cold water soluble acid compositions and to beverage mixes including such compositions. More particularly, this invention relates to stable, storable, dry, powdered beverage mixes incorporating fumaric acid and/or adipic acid mixed with a synergistic mixture of surface active agents.

The terms "cold water soluble" and "readily soluble in cold water" as used herein connote fumaric acid and/or adipic acid containing products that substantially completely dissolve in about 100 parts by weight of water at about 5 to 10° C. within one minute and with a minimum of agitation. The intensity of agitation required need only be sufficient to expose the acid particles to successive portions of water and to eliminate the formation of a quiescent envelope of a saturated acid solution about each of the particles.

Dry cold water soluble beverage mixes generally comprise an acidulant, flavoring, coloring and a filler, such as dextrose or sucrose. Traditionally, powdered cold water soluble beverage mixes utilize citric acid as the acidulant. However, mixes utilizing citric acid display poor storage stability due to the hygroscopic nature of citric acid. It was therefore proposed to substitute fumaric acid and/or adipic acid, which not only are more effective acidulants, but are also non-hygroscopic.

Notwithstanding the attractiveness of these properties, fumaric acid and adipic acid have one serious drawback. This shortcoming is their exceedingly low and slow solubility in water. Less than one part of fumaric acid, and only about one and a half parts of adipic acid, can be dissolved in one hundred parts of water at approximately room temperature. By contrast, citric acid readily dissolves in less than its own weight of water at moderate temperatures. It is therefore necessary to improve the solubility behavior of fumaric acid and/or adipic acid to permit their use as acidulants in powdered cold water soluble beverage mixes.

There have been many attempts to improve the solubility behavior of fumaric and/or adipic acid in cold water. It is known that the solubility characteristics of fumaric acid and/or adipic acid can be enhanced by milling the commercially available crystals to an average particle size of about 20 to 50 microns.

It is also known to incorporate a surface active agent with the milled acid particles prior to inclusion into the dry beverage mix. For example, the solubility behavior of finely ground fumaric acid and/or adipic acid can be improved by admixing therewith a partial long chain fatty acid ester of a polyoxyethylene derivative of a hexitol anhydride derived from sorbitol, which is hereinafter referred to as a sorbitan ester. Examples of a few water soluble sorbitan esters are polyoxyethylene sorbitan monolaureate, polyoxyethylene sorbitan palmitate, polyoxyethylene sorbitan stearate, polyoxyethylene sorbitan monooleate, and the like. The preferred sorbitan ester is polyoxyethylene sorbitan stearate.

Additionally, the solubility behavior of adipic acid and/or fumaric acid can also be improved by admixing therewith a dialkyl ester of sodium sulfosuccinate containing between 7 and 11 carbon atoms in each of the alkyl chains, which is hereinafter referred to as a sulfosuccinate ester. A preferred sulfosuccinate ester is di-(2-ethylhexyl)-sodium sulfosuccinate. Other representative sulfosuccinate esters of this type include di-(n-heptyl)-sodium sulfosuccinate, di-(n-octyl)-sodium sulfosuccinate, di-(1-methyl-4-ethyloctyl)-sodium sulfosuccinate, di-(1-methylhexyl)-sodium sulfosuccinate, di-(1-butylamyl)-sodium sulfosuccinate, di-(1-isobutyl-3-methylbutyl)-sodium sulfosuccinate, mono-2-ethylhexyl, mono-1-methyl-4-ethylhexyl-sodium sulfosuccinate, mono-2-ethylhexyl, mono-1-methylheptyl-sodium sulfosuccinate, di-(1-methyl-4-ethylhexyl)-sodium sulfosuccinate, and the like.

While each of the above surface active agents improves the cold water solubility behavior of fumaric acid and/or adipic acid, the storage characteristics of fumaric acid or adipic acid mixed with either of the above classes of surface active agents leave much to be desired, particularly when the acids are utilized as the acidulant in a dry powdered beverage mix.

Fumaric acid or adipic acid compositions containing a sorbitan ester as the surface active agent display excellent storage stability under high humidity conditions, but poor stability at ambient conditions. On the other hand, fumaric acid or adipic acid compositions containing a sulfosuccinate ester as the surface active agent display excellent storage stability at ambient conditions, but poor stability under high humidity conditions.

In contrast to the above, it has been found that cold water soluble compositions utilizing fumaric acid or adipic acid mixed with a sorbitan ester and a sulfosuccinate ester display excellent storage stability at both ambient and high humidity conditions. The surface active agents utilized conjointly exert a synergistic action that enhances the favorable characteristic of each class of surface active agent while minimizing their less desirable characteristics.

The quantity of the sorbitan ester utilized can vary from about 0.1 to 2.0% by weight of the acid.

The quantity of the sulfosuccinate ester utilized can vary from about 0.1 to 1.0% by weight of acid.

Although this invention can be used wherever fumaric acid or adipic acid compositions are required to possess rapid solubility in cold water and storage stability, a preferred use is in cold water soluble dry powder beverage mixes, generally fruit flavored. A typical formula for a fruit flavored beverage mix, such as utilized in this invention, is, by weight per 100 parts, from 68 to 85 parts dextrose or other sweetening filler, from 0.5 to 3.0 parts color and flavoring and from 14 to 29 parts fumaric acid or adipic acid. It is understood that the quantity of each ingredient in the composition will vary with the fruit flavor selected. For comparative purposes, the beverage mix utilized in the subsequent examples is standardized by weight at 76 parts dextrose, 2 parts color and flavoring, and 22 parts fumaric acid or adipic acid.

Dry powdered beverage mixes can be prepared in a number of ways. One method is to prepare an acid composition by mixing commercially available fumaric acid and/or adipic acid with the surface active agents, milling the acid composition to a fine powder and thereafter blending into the powder the flavoring, coloring, and filler.

Another method is to mill the commercially available fumaric acid and/or adipic acid to a powder, add the surface active agents to the powder, mix until the requisite intimacy of contact is achieved between the acid particles and the surface active agents and thereafter mix in the filler, flavoring and color. It is understood that when using liquid surface active agents, it is preferred to employ relatively dilute solutions which are added to the acid particles in a manner that minimizes any tendency of the surface active agents toward local concentration on the acid particles. While this modification does result in formation of a satisfactory product, it is necessary to remove the solvent therefrom after the solution is uniformly distributed. However, during the solvent removal, the solvent dampened acid particles have a tendency to lump or agglomerate and ofter require additional milling to again reduce the size of the treated acid particles.

To avoid the need for additional milling, it is preferred to add the surface active agents to the acid crystals prior to milling. This is most conveniently accomplished by liquefying the surface active agents in any suitable manner.

For example, the surface active agents may be fluidized by dissolving in water or other relatively volatile solvent, or by heating the surface active agents above their melting points. The solvent, if any, is removed, and the acid composition is then milled.

Since beverage mixes generally utilize a crystalline filler such as dextrose, another method of preparing a beverage mix is to mill all or a portion of the dextrose with the acid composition. Storage stability at both ambient and humidity conditions are thus further improved. Although the exact reason for the improvement is not certain, it is believed that particle uniformity enhances stability.

Color and flavoring can be incorporated into a beverage mix at any time. However, since the amount of color and flavoring used is small, it is preferred to admix the color and flavoring with the beverage mix dextrose. The combination of color, flavoring and dextrose is hereinafter referred to as a beverage base. Since the beverage mix utilized herein is standardized, by weight, at 76 parts dextrose and 2 parts color and flavoring, and 22 parts acid, the beverage base comprises, by weight, 76 parts dextrose and 2 parts color and flavoring. As previously stated, the composition of the beverage base varies with the flavor selected.

Accordingly, commercially available fumaric acid and/or adipic acid is admixed with a sorbitan ester, a sulfosuccinate ester, and all, or a portion, of a beverage base. The dry mixture is then milled to provide a homogeneous powder wherein the average particle size ranges from about 20 to 50 microns. The homogeneous powder has further admixed therewith sufficient additional beverage base, if required, to provide a beverage mix, standardized for the purpose of illustration, comprising, by weight, 76 parts dextrose, 2 parts color and flavoring, and 22 parts fumaric acid or adipic acid composition. It is understood that in the event that dextrose, rather than a beverage base, is milled with the acid, the color and flavoring is admixed with the milled homogeneous powder along with any additional dextrose required to provide a mix having the standardized formula.

The proportions of beverage base to acid milled is preferably, by weight, between 0.25 to 1 part beverage base for each part of acid. Although the entire beverage mix can be milled, which is, by weight, approximately 3.55 parts beverage base to one part of the acid composition, no useful purpose is served, whereas milling mixtures containing less than 0.25 part beverage base for each part of acid does not impart sufficient improved stability.

While dextrose is utilized in the preferred embodiment, other crystalline sugars, such as the monosaccharides, disaccharides, polysaccharides, and the like, may be employed. The sugar selected should be of such nature as to be capable of being milled and admixed with other crystalline ingredients to provide a homogeneous mixture.

The invention will be more readily understood by reference to the examples which follow. Unless otherwise specified, all proportions in these embodiments and throughout the specification are expressed in parts by weight.

EXAMPLE I

A fumaric acid composition is prepared by mixing a quantity of commercially available fumaric acid with 0.5% by weight of fumaric acid of polyoxyethylene sorbitan stearate, and 0.25% by weight of fumaric acid of di-(2-ethylhexyl)-sodium sulfosuccinate. 22 grams of a beverage base containing, by weight, 2 parts color and flavoring and 76 parts dextrose, is mixed with 22 grams of the fumaric acid composition. The acid-beverage base mixture is milled to reduce the average particle size to from about 20 to 50 microns. An additional 56 grams of the beverage base is thoroughly admixed with the milled powder to yield a dry beverage mix having, by weight, 76 parts dextrose, 2 parts color and flavoring, and 22 parts fumaric acid. A 14.2 gram sample of this dry beverage mix is placed in a paper envelope which is sealed and stored in a humidity chamber at 38° C. and 90% relative humidity. After 17 days the envelope is removed from the humidity chamber, opened and inspected. The contents are substantially lump-free and granular. The sample, when added to 2 quarts of water at 10° C., is substantially completely dissolved within one minute with mild agitation.

EXAMPLE II

Example I is substantially repeated milling 22 grams of the fumaric acid composition with 11 grams of the beverage base, and thereafter 67 grams of the beverage base is admixed with the milled homogeneous powder. After six days of storage at 38° C. and 90% relative humidity, a 14.2 gram sample which had been sealed in a paper envelope is substantially lump-free, granular and readily soluble in two quarts of water at 10° C. within 1 minute with mild stirring.

EXAMPLE III

Example I is substantially repeated milling 44 grams of the fumaric acid composition with 11 grams of the beverage base, and thereafter 145 grams of the beverage base is admixed with the milled powder. After six days of storage at 38° C. and 90% relative humidity, a 14.2 gram sample which had been sealed in a paper envelope is substantially lump-free, granular and readily soluble in two quarts of water at 10° C. within one minute with mild stirring.

EXAMPLES IV, V and VI

Samples prepared as in Examples I, II and III are placed in paper envelopes and sealed. The samples are stored in a humidity chamber at 32 C. and 70% relative humidity for 9 days. The samples are found to be substantially dry, powderlike and readily soluble in two quarts of water at 10° C. within one minute with mild stirring.

EXAMPLE VII

A fumaric acid composition is prepared by mixing a quantity of commercially available fumaric acid with 0.75% di-(2-ethylhexyl)-sodium sulfosuccinate by weight of the acid. 22 grams of the fumaric acid-sulfosuccinate ester composition is mixed with 22 grams of beverage base and milled to reduce the average particle size to form about 20 to 50 microns. An additional 56 grams of beverage base is admixed with the milled powder to yield a beverage mix having, by weight, approximately 76 parts dextrose, 2 parts color and flavoring, and 22 parts fumaric acid. A 14.2 gram sample of the composition is placed in an envelope, sealed, and stored at ambient conditions for 40 days. At the end of 40 days, the envelope is opened, and the contents are inspected. The sample is substantially powder-dry and, when added to two quarts of water at 10° C., substantially completely dissolves within one minute with mild stirring.

EXAMPLE VIII

A fumaric acid composition is prepared by mixing a quantity of commercially available fumaric acid with 0.7% polyoxyethylene sorbitan stearate by weight of the acid.

22 grams of the fumaric acid composition is mixed with 78 grams of beverage base and thereafter milled as in Example VII. 14.2 grams of the milled powder (approximate composition of beverage mixture is, by weight, 22 parts fumaric acid, 2 parts color and flavoring and 76 parts dextrose) is placed in a paper envelope, sealed and stored at ambient conditions for 29 days. At the end of this period, the envelope is opened and inspected. The contents are caked, and, when added to two quarts of water at 10° C., are slow in wetting, form a noticeable film and are not readily dissolved.

EXAMPLE IX

A fumaric acid composition is prepared by mixing a quantity of commercially available fumaric acid with 0.75% di-(2-ethylhexyl)-sodium sulfosuccinate by weight of the acid. 22 grams of the fumaric acid composition is mixed with 11 grams of beverage base, and thereafter milled as in Example VII. An additional 67 grams of beverage base is mixed into the milled powder and yields a beverage mix having the typical formula. A 14.2 gram sample of the beverage mix is placed in an envelope, sealed and stored in a humidity chamber at 38° C. and 90% relative humidity for 18 days. The resulting beverage mix, after storage, is caked, and, when added to 2 quarts of water at 10° C., approximately 50% dissolves after one minute with mild stirring.

EXAMPLE X

A fumaric acid composition is prepared by mixing a quantity of commercially available fumaric acid with 0.7% polyoxyethylene sorbitan stearate by weight of the acid. 22 grams of said acid composition is mixed with 78 grams of beverage base and thereafter milled as in Example VII. A 14.2 gram sample of the milled powder (approximate composition: 22 parts fumaric acid mixture, 2 parts color and flavoring, and 76 parts dextrose) is sealed in a paper envelope and stored in a humidity chamber at 38° C. and 90% relative humidity for 26 days. The resulting beverage mix, after storage, is substantially uncaked, pourable and essentially completely soluble in two quarts of water at 10° C. within one minute with mild stirring.

The characteristics described in the foregoing examples are summarized in Table I. As readily seen, cold water soluble beverage mixes prepared according to this invention display excellent storage stability at both ambient and high humidity conditions.

The procedures followed in the above examples are substantially repeated using adipic acid in place of fumaric acid. The adipic acid beverage mixes display substantially identical stability characteristics as the corresponding fumaric acid beverage mixes.

While this invention has been described with respect to certain embodiments, it is not so limited, and it is to be understood that variations and modifications thereof obvious to those skilled in the art may be made without departing from the spirit or scope of this invention.

The embodiments of the invention in which an exclusive property or privilege is claimed are defined as follows:

1. A cold water soluble acid composition storable at ambient and high humidity conditions comprising a milled admixture of an acid selected from the group consisting of fumaric acid and adipic acid, from about 0.1 to 2.0% by weight of said acid of a partial long chain fatty acid ester of a polyoxyethylene derivative of a hexitol anhydride derived from sorbitol and from about 0.1 to 1.0% by weight of said acid of a dialkyl ester of sodium sulfosuccinate containing between 7 and 11 carbon atoms, said composition having an average particle size of about 20 to 50 microns.

2. The composition according to claim 1 wherein said dialkyl ester of sodium sulfosuccinate is di-(2-ethylhexyl)-sodium sulfosuccinate.

3. The composition according to claim 1 wherein said fatty acid ester of a polyoxyethylene derivative of a hexitol anhydride derived from sorbitol is polyoxyethylene sorbitan stearate.

4. The composition according to claim 1 wherein said acid is fumaric.

5. The composition according to claim 1 wherein said acid is adipic.

6. A cold water soluble acid composition storable at ambient and high humidity conditions comprising a milled admixture of fumaric acid, from about 0.1 to 2.0% by weight of said acid of polyoxyethylene sorbitan stearate and from about 0.1 to 1.0% by weight of said acid of di-(2-ethylhexyl)-sodium sulfosuccinate, said composition having an average particle size of about 20 to 50 microns.

7. A cold water soluble acid composition storable at ambient and high humidity conditions comprising a milled admixture of adipic acid, from about 0.1 to 2.0% by weight of said acid of polyoxyethylene sorbitan stearate and from about 0.1 to 1.0% by weight of said acid of di-(2-ethylhexyl)-sodium sulfosuccinate, said composition having an average particle size of about 20 to 50 microns.

8. A cold water soluble beverage mix storable at ambient and high humidity conditions comprising, by weight, from 0.5 to 3.0 parts color and flavoring, from 68 to 86 parts crystalline sugar, and from 14 to 29 parts of a milled acid composition comprising an acid selected from the group consisting of fumaric acid and adipic acid admixed with, by weight of said acid, from about 0.1 to 2.0% of a partial long chain fatty acid ester of a polyoxyethylene derivative of a hexitol anhydride derived from sorbitol and from about 0.1 to 1.0% of a dialkyl ester of sodium sulfosuccinate containing between 7 and 11 carbon atoms, said composition having an average particle size of about 20 to 50 microns.

Table I

| Example No. | Percent sulfosuccinate ester | Percent sorbitan ester | Milled portion | | Storage stability tests ᵃ | | | | Solubility after storage |
|---|---|---|---|---|---|---|---|---|---|
| | | | Parts fumaric | Parts bev. base | Percent rel. humidity | Temp., °C. | Days | Bev. mix appearance after storage | |
| I | 0.25 | 0.5 | 1 | 1 | 90 | 38 | 17 | Granular | Excellent. |
| II | 0.25 | 0.5 | 2 | 1 | 90 | 38 | 6 | ___do___ | Do. |
| III | 0.25 | 0.5 | 4 | 1 | 90 | 38 | 6 | ___do___ | Do. |
| IV | 0.25 | 0.5 | 1 | 1 | 70 | 32 | 9 | Powdery | Do. |
| V | 0.25 | 0.5 | 2 | 1 | 70 | 32 | 9 | ___do___ | Do. |
| VI | 0.25 | 0.5 | 4 | 1 | 70 | 32 | 9 | ___do___ | Do. |
| VII | 0.75 | | 1 | 1 | (ᵇ) | (ᵇ) | 40 | ___do___ | Do. |
| VIII | | 0.7 | 1 | ᶜ 3.5 | (ᵇ) | (ᵇ) | 29 | Lumpy | Poor, wetted slowly. |
| IX | 0.75 | | 2 | 1 | 90 | 38 | 18 | ___do___ | Poor undissolved solids. |
| X | | 0.7 | 1 | ᶜ 3.5 | 90 | 38 | 26 | Granular | Excellent. |

ᵃ Sample prepared by adding sufficient unmilled beverage base to the milled portion to provide a mix comprising 76 parts dextrose, 2 parts color and flavoring, and 22 parts fumaric acid mixture, and placing a 14.2 gram sample in an envelope.
ᵇ Ambient conditions.
ᶜ Entire sample milled.

of sodium sulfosuccinate containing between 7 and 11 carbon atoms, said composition having an average particle size of about 20 to 50 microns.

9. A cold water soluble beverage mix storable at ambient and high humidity conditions comprising, by weight, from 0.5 to 3.0 parts color and flavoring, from 68 to 86 parts crystalline sugar, and from 14 to 29 parts of a milled fumaric acid composition comprising, by weight of said acid, from 0.1 to 2.0% of polyoxyethylene sorbitan stearate and from 0.1 to 1.0% of di-(2-ethylhexyl)-sodium sulfosuccinate, said composition having an average particle size of about 20 to 50 microns.

10. A cold water soluble beverage mix storable at ambient and high humidity conditions comprising, by weight, from 0.5 to 3.0 parts color and flavoring, from 68 to 86 parts crystalline sugar, and from 14 to 29 parts of a milled adipic acid composition comprising, by weight of said acid, from 0.1 to 2.0% of polyoxyethylene sorbitan stearate and from 0.1 to 1.0% of di-(2-ethylhexyl)-sodium sulfosuccinate, said composition having an average particle size of about 20 to 50 microns.

11. A method of preparing a cold water soluble beverage mix storable at ambient and high humidity conditions which comprises admixing from about 0.25 to 4 parts by weight of a beverage base comprising by weight from about 0.5 to 3.0 parts color and flavoring and from about 68 to 86 parts crystalline sugar with one part by weight of an acid composition comprising an acid selected from the group consisting of fumaric acid and adipic admixed with, by weight of said acid, from about 0.1 to 2.0% of a partial long chain fatty acid ester of a polyoxyethylene derivative of a hexitol anhydride derived from sorbitol and from about 0.1 to 1.0% of a dialkyl ester of sodium sulfosuccinate containing between 7 and 11 carbon atoms, milling said beverage base and acid composition, and mixing sufficient additional beverage base into said milled product to yield a dry cold water soluble beverage mix comprising from 0.5 to 3.0% color and flavoring, from 68 to 86% sugar, and from 14 to 29% acid composition, said composition having an average particle size of about 20 to 50 microns.

12. A method of preparing a stable storable cold water soluble beverage mix according to claim 11 wherein said acid is fumaric.

13. A method of preparing a stable storable cold water soluble beverage mix according to claim 11 wherein said acid is adipic.

14. A method of preparing a stable storable cold water soluble beverage mix according to claim 11 wherein said acid is fumaric, said partial long chain fatty acid ester of a polyoxyethylene derivative of a hexitol anhydride derived from sorbitol is polyoxyethylene sorbitan stearate, and said dialkyl ester of sodium sulfosuccinate is di-(2-ethylhexyl)-sodium sulfosuccinate.

15. A method of preparing a stable storable cold water soluble beverage mix according to claim 11 wherein said acid is adipic, said partial long chain fatty acid ester of a polyoxyethylene derivative of a hexitol anhydride derived from sorbitol is polyoxyethylene sorbitan stearate, and said dialkyl ester of sodium sulfosuccinate is di-(2-ethylhexyl)-sodium sulfosuccinate.

References Cited by the Examiner
UNITED STATES PATENTS

| | | | |
|---|---|---|---|
| 2,332,735 | 10/43 | Lyons | 99—78 |
| 3,009,810 | 11/61 | Raffensperger et al. | 99—78 |
| 3,009,811 | 11/61 | Raffensperger et al. | 99—78 |

A. LOUIS MONACELL, *Primary Examiner.*